G. V. H. WHITBECK.
ATTACHING COLTERS TO PLOWS.
No. 194,116. Patented Aug. 14, 1877.
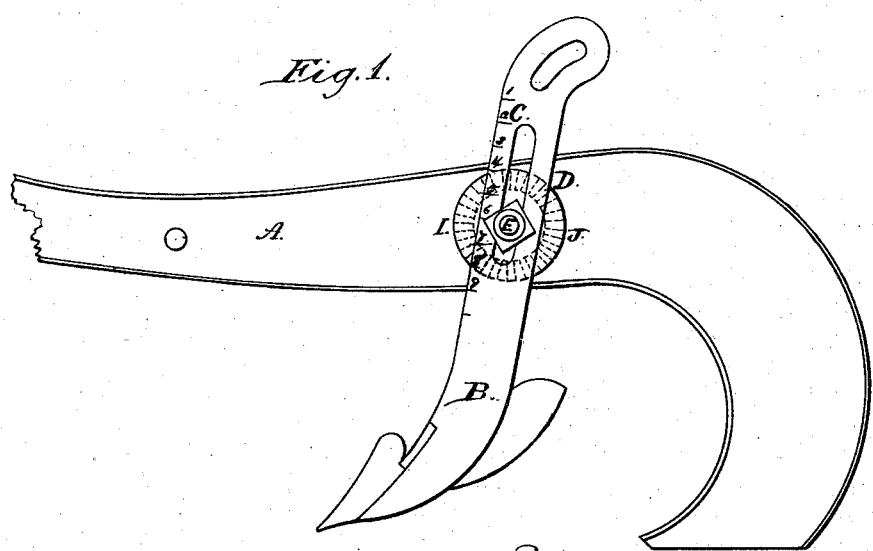
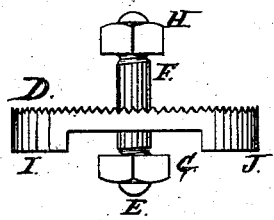
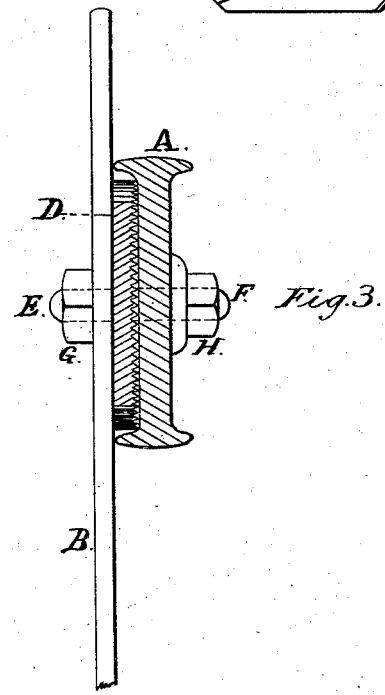
Witnesses:
William R. Brookes.
Lysander Reelfield.
Inventor:
George V. H. Whitbeck.

UNITED STATES PATENT OFFICE.

GEORGE V. H. WHITBECK, OF PHELPS, NEW YORK.

IMPROVEMENT IN ATTACHING COLTERS TO PLOWS.

Specification forming part of Letters Patent No. 194,116, dated August 14, 1877; application filed April 5, 1877.

*To all whom it may concern:*

Be it known that I, GEORGE V. H. WHITBECK, of the town of Phelps, county of Ontario, and State of New York, have invented a new and useful Improvement for Attaching and Adjusting a Jointer-Plow or Colter to the Plow-Beam, which improvement is fully set forth in the following specification and accompanying drawing.

The object of my invention is to furnish a neat, effective, and simple device for attaching the jointer-plow or colter to the plow-beam, which shall possess the following advantages, viz: to regulate from one position upon the plow-beam the vertical motion or depth of the jointer-plow or colter, also its angular position or inclination to the ground, with great nicety and certainty of adjustment; to change either one of these positions without liability to change the other, and which shall, when so adjusted, be held in a very solid and substantial manner.

Referring to the drawing forming part of this specification, Figure 1 represents a side view of the plow-beam and my attachment; Fig. 2, an enlarged top view of my device; and Fig. 3, an end view, with section cut through the plow-beam and disk just inside the boss J.

Similar letters of reference in each of the figures refer to like parts.

A is the plow-beam; B, the jointer-plow or colter, having a slot, C. D represents a disk, having upon its inner face a series of radial notches or indentations. There are also corresponding indentations upon the face of the beam, and into which those of the disk accurately mesh. Diametrically across the outer face of the disk D a recess is made equal in depth to the thickness of the jointer-plow standard, and as wide as the same, through which the jointer-plow slides in adjusting its depth. The front edge of the jointer-plow is graduated to inches and parts thereof, so that its depth may be regulated with precision, ease, and certainty. E F, Figs. 2 and 3, is a double-ended bolt, preferably rigidly attached to the disk D, each having its corresponding nuts G and H. The end E of the bolt passes through the slot C of the jointer-plow or colter, which, by means of the nut G, is securely fastened to any required depth, receiving thereby not only the support of the whole broad surface of the disk and the bosses I and J on each side of the recess, but by making the latter of the proper depth the jointer-plow or colter is, in addition, clamped tightly against the top and bottom flanges of the plow-beam.

The end F of the bolt passes through a hole in the plow-beam, and by means of the nut H the disk D, with its indented face, is firmly drawn into the corresponding indentations on the beam, and thus, with the jointer-plow or colter, rigidly held at any desired angle or inclination to the ground.

It may also, if desired, be turned upward close under the plow-beam, if not required for use, or very readily detached entirely.

I do not confine myself to any particular form of the indentations, as these may be varied, or a series of short pins and holes be used; but I prefer the radial form here indicated as giving fineness of adjustment.

It will be readily seen that by slacking up the nut G alone the jointer-plow or colter may, by means of the graduated scale upon its edge, be easily and accurately adjusted to any required depth, with no danger of disturbing its inclination; also that, by slacking up the nut H alone, and turning the disk D, with jointer-plow or colter attached, any desired inclination may, by means of the fine indentations on its inner face, be given thereto without changing the depth, except the little made by the circle it would describe, and which could be afterward corrected. In these respects, aside from the permanency of the adjustment, being obviously superior to the commonly-used bar and clasp or analogous arrangements, (in which, while making one adjustment, the other was exceedingly liable to be lost,) and which experience has proven to be very difficult to manage, and an inefficient device to the attainment of these ends, my improvement also gives to the plow a much lighter and more finished appearance.

I am aware that a patent was granted to Thomas Sheehan, July 5, 1870, No. 105,134, in which is used a notched disk, but in which the colter is held to the plow-beam by means of a single bolt passing through the whole, and drawn together by a thumb-nut on the beam side, in which case, if one adjustment, whether for depth or inclination, is made, the other is liable to be lost; but my invention differs from that in having rigidly attached to the disk D, and forming part of the same, the double-ended bolt E F, by which construction either one of these adjustments can be made separately, with no danger whatever of disturbing or losing the other, as hereinbefore described.

Having thus described my invention, what I claim as new, and desire to secure by Letters Patent, is—

The notched and recessed disk D, having rigidly attached thereto, and forming part of the same, the double-ended bolt E F, arranged in combination with the slotted jointer-plow or colter B and plow-beam A, substantially as and for the purposes herein set forth and described.

GEORGE V. H. WHITBECK.

Witnesses:
WILLIAM R. BROOKS,
LYSANDER REDFIELD.